United States Patent
Salvadori

(10) Patent No.: US 11,235,400 B2
(45) Date of Patent: Feb. 1, 2022

(54) TIRE DOWNSIZING APPARATUS

(71) Applicant: Technical Rubber Company, Inc., Johnstown, OH (US)

(72) Inventor: Samuel Salvadori, Rovereto (IT)

(73) Assignee: Technical Rubber Company, Inc., Johnstown, OH (US)

( * ) Notice: Subject to any disclaimer, the term of this patent is extended or adjusted under 35 U.S.C. 154(b) by 0 days.

(21) Appl. No.: 17/143,438

(22) Filed: Jan. 7, 2021

(65) Prior Publication Data

US 2021/0129240 A1    May 6, 2021

Related U.S. Application Data

(62) Division of application No. 16/124,577, filed on Sep. 7, 2018, now Pat. No. 10,913,123.

(Continued)

(51) Int. Cl.
*B23D 36/00* (2006.01)
*B02C 19/00* (2006.01)
(Continued)

(52) U.S. Cl.
CPC ............ *B23D 36/0033* (2013.01); *B02C 1/00* (2013.01); *B02C 18/02* (2013.01);
(Continued)

(58) Field of Classification Search
CPC ...... B23D 36/00; B23D 36/0033–0066; B23D 33/02; B23D 33/04; B02C 19/0056; B02C 1/00–10
(Continued)

(56) References Cited

U.S. PATENT DOCUMENTS 2,394,392 A * 2/1946 Eneas ...................... B26D 3/28
                                                          29/2.22
3,364,526 A   1/1968 Sandor et al.
(Continued)

FOREIGN PATENT DOCUMENTS

| AU | 662744 B2 | 9/1995 |
| JP | 2005-238800 A | 9/2005 |

(Continued)

OTHER PUBLICATIONS

Basti et al.; "Tools with built-in thin film thermocouple sensors for monitoring cutting termperature"; Int'l Journal of Machine Tools & Manufacture; vol. 47; 2007; p. 793-798.
(Continued)

*Primary Examiner* — Kenneth E Peterson
*Assistant Examiner* — Richard D Crosby, Jr.
(74) *Attorney, Agent, or Firm* — BakerHostetler

(57) ABSTRACT

Systems and methods for downsizing tires are disclosed. An automated downsizing apparatus comprises a cradle, mandrel table, cutting apparatus, and a control unit. A tire mounted on the cradle may be received by the movable and rotatable mandrel table, and positioned for engagement with the cutting apparatus. A user may customize a cutting configuration to be executed by the control unit. The control unit positions the mandrel table and cutting apparatus to remove portions from the tire, according to the cutting configuration. During operation, one or more system parameters may be monitored to determine compliance with the selected configuration, and the automated execution may be manually overridden.

9 Claims, 14 Drawing Sheets

Related U.S. Application Data

(60) Provisional application No. 62/556,263, filed on Sep. 8, 2017.

(51) Int. Cl.
*B26D 3/00* (2006.01)
*B02C 18/02* (2006.01)
*B02C 1/00* (2006.01)
*B23D 33/02* (2006.01)
*B23D 35/00* (2006.01)

(52) U.S. Cl.
CPC .......... *B02C 19/0056* (2013.01); *B23D 33/02* (2013.01); *B23D 35/001* (2013.01); *B26D 3/005* (2013.01)

(58) Field of Classification Search
USPC .......................................................... 83/951
See application file for complete search history.

(56) References Cited

U.S. PATENT DOCUMENTS

| | | | | |
|---|---|---|---|---|
| 3,583,267 A * | 6/1971 | Topolski | | B26D 1/38 83/15 |
| 3,911,772 A * | 10/1975 | Kisielewski | | B26D 3/005 83/278 |
| 4,137,101 A * | 1/1979 | Stock | | B60C 25/0524 148/201 |
| 4,374,573 A | 2/1983 | Rouse et al. | | |
| 4,450,738 A | 5/1984 | Tupper et al. | | |
| 4,609,161 A | 9/1986 | Weyand, Jr. | | |
| 4,620,821 A * | 11/1986 | Roth | | B23C 5/00 407/1 |
| 4,682,522 A | 7/1987 | Barclay | | |
| 4,694,716 A | 9/1987 | Sakamoto et al. | | |
| 4,738,172 A * | 4/1988 | Barclay | | B26D 3/005 83/18 |
| 4,802,635 A | 2/1989 | Barclay | | |
| 4,873,759 A | 10/1989 | Burch | | |
| 4,914,994 A * | 4/1990 | Barclay | | B29B 17/02 83/18 |
| 4,976,178 A | 12/1990 | Barclay | | |
| 5,054,351 A * | 10/1991 | Jolliffe | | B26D 3/005 83/430 |
| 5,142,779 A | 9/1992 | LaBounty | | |
| 5,147,163 A | 9/1992 | Booker et al. | | |
| 5,267,496 A | 12/1993 | Roach et al. | | |
| 5,472,372 A | 12/1995 | Marangoni | | |
| 5,495,882 A | 3/1996 | Trant | | |
| 5,531,146 A | 7/1996 | Pederson | | |
| 5,551,325 A * | 9/1996 | Schutt | | B26D 3/005 83/133 |
| 5,765,727 A * | 6/1998 | Masley | | B29B 17/02 225/3 |
| 5,783,035 A * | 7/1998 | Pederson | | B29B 17/02 156/763 |
| 5,868,328 A * | 2/1999 | Luoma | | B29B 17/04 241/101.2 |
| 6,234,055 B1 | 5/2001 | Taylor | | |
| 6,240,819 B1 | 6/2001 | Su et al. | | |
| 6,257,113 B1 | 7/2001 | Lederbauer | | |
| 6,364,981 B1 | 4/2002 | Smith et al. | | |
| 6,422,285 B1 | 7/2002 | Gonzaga | | |
| 6,520,722 B2 * | 2/2003 | Hopper | | B23D 61/021 407/42 |
| 6,565,026 B1 | 5/2003 | Hall | | |
| 7,805,987 B1 | 10/2010 | Smith | | |
| 7,975,579 B1 * | 7/2011 | Pederson | | B29B 17/0412 82/1.11 |
| 8,621,968 B1 * | 1/2014 | Pederson | | B26D 7/02 83/410.9 |
| 9,211,656 B2 * | 12/2015 | Prochello | | B29B 17/02 |
| 10,022,895 B2 * | 7/2018 | Dorn | | B29B 17/02 |
| 10,913,123 B2 * | 2/2021 | Salvadori | | B02C 18/02 |
| 11,077,573 B2 * | 8/2021 | Rogers | | B26D 3/005 |
| 2002/0046814 A1 | 4/2002 | Vignoli | | |
| 2004/0107811 A1 | 6/2004 | Schmeling | | |
| 2005/0092075 A1 | 5/2005 | Saunders et al. | | |
| 2006/0070504 A1 | 4/2006 | Downing et al. | | |
| 2006/0137500 A1 | 6/2006 | Downing | | |
| 2006/0196332 A1 | 9/2006 | Downing et al. | | |
| 2008/0314216 A1 * | 12/2008 | Delgado | | B29D 30/1635 83/452 |
| 2010/0064868 A1 * | 3/2010 | Michael | | B26D 3/005 83/54 |
| 2010/0154611 A1 * | 6/2010 | Lammlein, Jr. | | B26D 3/003 83/78 |
| 2011/0023668 A1 * | 2/2011 | McMahon | | B26D 3/005 83/13 |
| 2013/0205963 A1 * | 8/2013 | Prochello | | B26F 1/02 83/36 |
| 2015/0047453 A1 * | 2/2015 | Moller | | B25J 17/00 74/490.05 |
| 2015/0298332 A1 * | 10/2015 | Blondelet | | B26D 1/09 83/54 |
| 2015/0298333 A1 * | 10/2015 | Blondelet | | B26D 7/2628 83/54 |
| 2019/0076939 A1 | 3/2019 | Salvadori | | |

FOREIGN PATENT DOCUMENTS

| | | |
|---|---|---|
| WO | WO 1997/026122 A1 | 7/1997 |
| WO | WO 2001/017733 A2 | 3/2001 |
| WO | WO 2001/049462 A1 | 7/2001 |
| WO | WO 2012/141613 A2 | 10/2012 |
| WO | WO 2014/147108 A1 | 9/2014 |

OTHER PUBLICATIONS

International Patent Application No. PCT/US2018/049892; Int'l Search Report and the Written Opinion; dated Dec. 4, 2018; 18 pages.
International Patent Application No. PCT/US2018/049892; Int'l Preliminary Report on Patentability; dated Mar. 19, 2020; 10 pages.

* cited by examiner

TIRE DOWNSIZING APPARATUS

CROSS REFERENCE TO RELATED APPLICATIONS

This application is a Divisional application of U.S. patent application Ser. No. 16/124,557 filed Sep. 7, 2018, which claims benefit under 35 U.S.C. § 119(e) of Provisional U.S. Patent Application No. 62/556,223, filed on Sep. 8, 2017. The contents of which are hereby incorporated by reference in its entirety their entireties.

TECHNICAL FIELD

The present invention relates generally to systems and methods for cutting tires. More specifically, the present disclosure relates to downsizing tires according to automated cutting operations.

BACKGROUND

Tire cutting apparatuses are often utilized to break down a tire into smaller pieces for recycling and disposal. Tires are often comprised of a tough, dense material, such as rubber, which is beneficial for durability during the tire's lifespan and intended use. However, this also results in tire cutting apparatuses requiring great power and cutting force to cut through the thick material.

Accordingly, traditional tire cutting apparatuses are often larger machines having enough power to break down the tire into multiple pieces. These apparatuses often require a human operator, or at least a great amount of human intervention to make cuts to the tire and/or supervise the operation of the machinery. However, these apparatuses often have additional labor costs associated with the human operation and/or supervision of the cutting operation. It may also be difficult, if not impossible to ensure uniformity in the size of the pieces being cut from the tire due to operator variability and subjectivity in the cuts.

Even in semi-automated cutting machines, ensuring uniformity of the cut pieces and/or customizing the size and type of cut can be difficult. The number of types of cuts made to a tire may be limited, and apparatuses may be specifically designed for a particular size or model of tire. As such, parameters of the cut cannot be easily changed, automated, or adapted other types. In addition, given the large size and heavy weight of tires—especially tires for large vehicles and heavy machinery—positioning and stabilizing tires to receive a great amount of cutting force proves difficult, and the cutting machines may require the use of heavy machinery to load/unload, lift, and reposition the tire into an appropriate orientation for cutting.

SUMMARY

The present disclosure relates to downsizing tires using automated systems and methods. In an embodiment, a downsizing apparatus comprises a loading/unloading cradle, a mandrel affixed to a mandrel table, a cutting apparatus with a plurality of blades, a power unit, a control unit to execute the cutting process, and a conveyor belt to transport removed tire pieces.

In an embodiment, the loading/unloading cradle secures a tire, and enables the mandrel to receive the tire, and place the tire in a position to engage the cutting apparatus. The mandrel table is both movable and rotatable, to allow precise positioning of the tire in both horizontal and vertical positions without the need for a crane or other machinery.

A control unit automates the downsizing operation, and may receive user input indicating a pre-determined and/or customized cutting process for the tire. The control unit can send positioning information to the mandrel table and cutting apparatus to coordinate cutting tire portions, according to the selected cutting configuration.

Each process in the downsizing system may be fully automated, thereby streamlining the downsizing operations and significantly reducing the amount of user operation and intervention. As a result, cutting operations are customized and completed quickly and efficiently. The operations may be executed on a range of tire sizes, styles, and shapes, including but not limited to oversized tires, radial tires, and textile tires.

According to an embodiment, the cutting apparatus comprises at least two opposing blades. The blades contact opposite sides of a width of the tire to cut the tire in a shearing action, and remove a portion from the tire bead. The blades may asymmetric blades, and may also be L-shaped. During the cutting operation, one or more system parameters may be monitored to determine system diagnostics and/or compliance with the user-selected configuration.

In an embodiment, automation may be manually overridden at any time during the cutting configuration's execution.

BRIEF DESCRIPTION OF THE DRAWINGS

The foregoing and other features of the present disclosure will become more fully apparent from the following description, taken in conjunction with the accompanying drawings. These drawings depict only several embodiments in accordance with the disclosure and are therefore, not to be considered limiting of its scope. The disclosure will be described with additional specificity and detail through use of the accompanying drawings.

In the drawings.

DETAILED DESCRIPTION OF ILLUSTRATIVE EMBODIMENTS

Various examples of the present disclosure described herein are generally directed to systems and methods for, among other things, downsizing tires and automating related operations. It will be understood that the provided examples are for purposes of clarity and understanding, and are not meant to limit or restrict the claimed subject matter or relevant portions of this disclosure in any manner.

Figure 1:
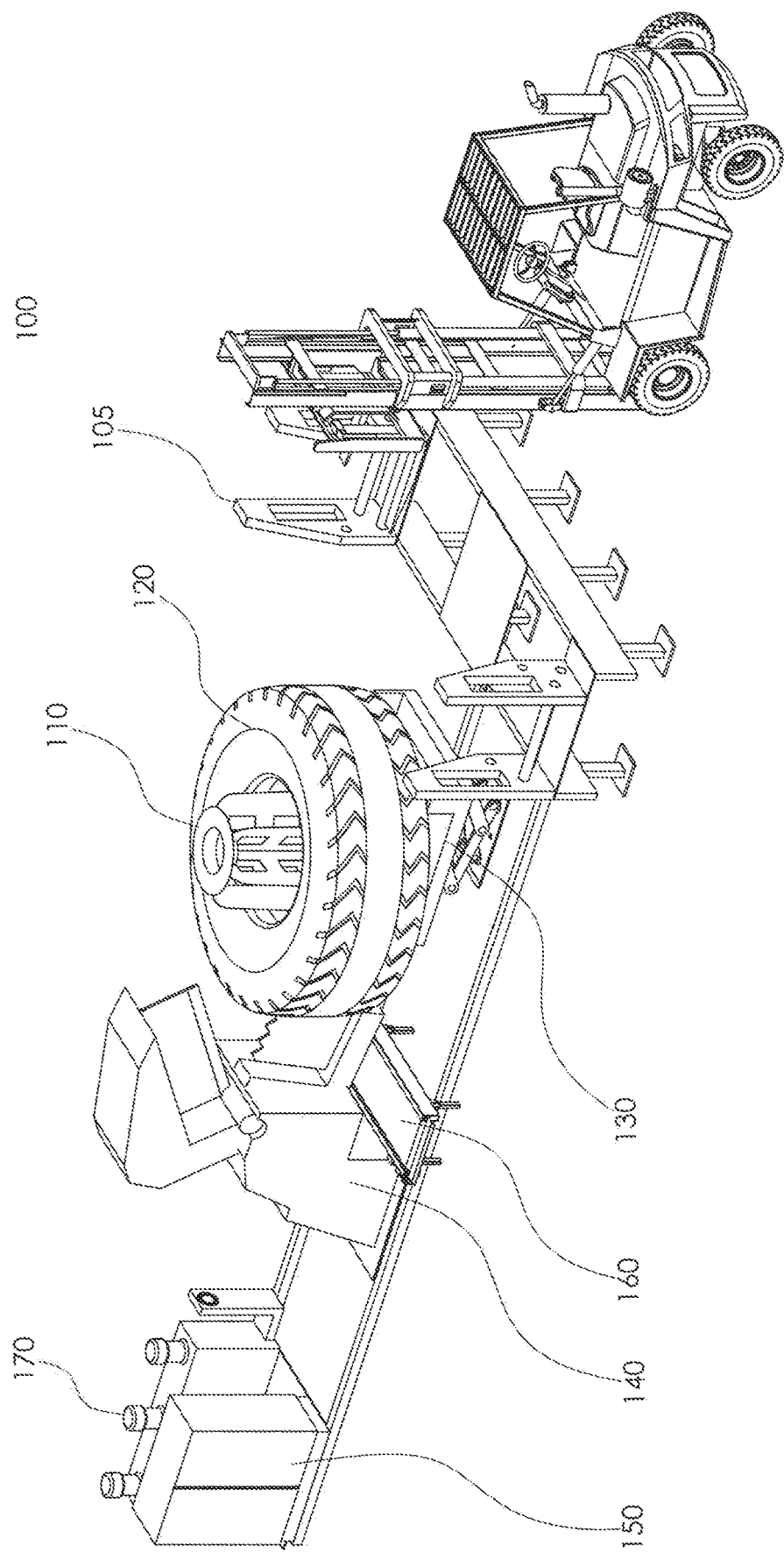
FIG. 1 depicts a perspective view of a tire downsizing apparatus in accordance with an embodiment of the present disclosure.

Turning to FIG. 1, an example tire downsizing machine 100 is depicted, comprising a loading cradle 105, a mandrel 110 affixed to a mandrel table 130, a cutting apparatus 140, a control unit 150, and a conveyor belt 160. An automated cutting process may be controlled by the control unit 150, which can receive user input via a user interface on a computing device indicating a pre-set, or pre-determined cutting process, or "recipe". The control unit may be in wired or wireless network communication with various components of the tire downsizing apparatus, including, but not limited to, the mandrel table, the cutting apparatus, conveyor belt, and computing device.

An automated tire downsizing process may begin when a tire 120 is loaded onto the loading cradle 105. The tire may be loaded onto the cradle with a forklift or similar equipment or machinery to properly position the tire in the cradle. From the loading cradle 105, the tire may be mounted onto the mandrel table 130, secured by the mandrel 110. The control unit may direct a rotational movement of the mandrel table 130, and a position of the mandrel table relative to the cutting apparatus. The position of the cutting apparatus 140, may also be controlled by the control unit, to alter a distance between the cutting apparatus and mandrel table. The control unit may also control a cutting operation of the cutting apparatus by coordinating movements between the mandrel table and cutting apparatus, based on the instructions, i.e., recipe, received from the computing device. For example, a rotational movement and position of the mandrel table may be coordinated with the cutting movements of the cutting apparatus 140 to remove one or more chunks from the bead of the tire in accordance with the cutting operation. A conveyor belt 160, or other transport system may receive and transport the one or more chunks away from the cutting area to a different location.

Figure 2:
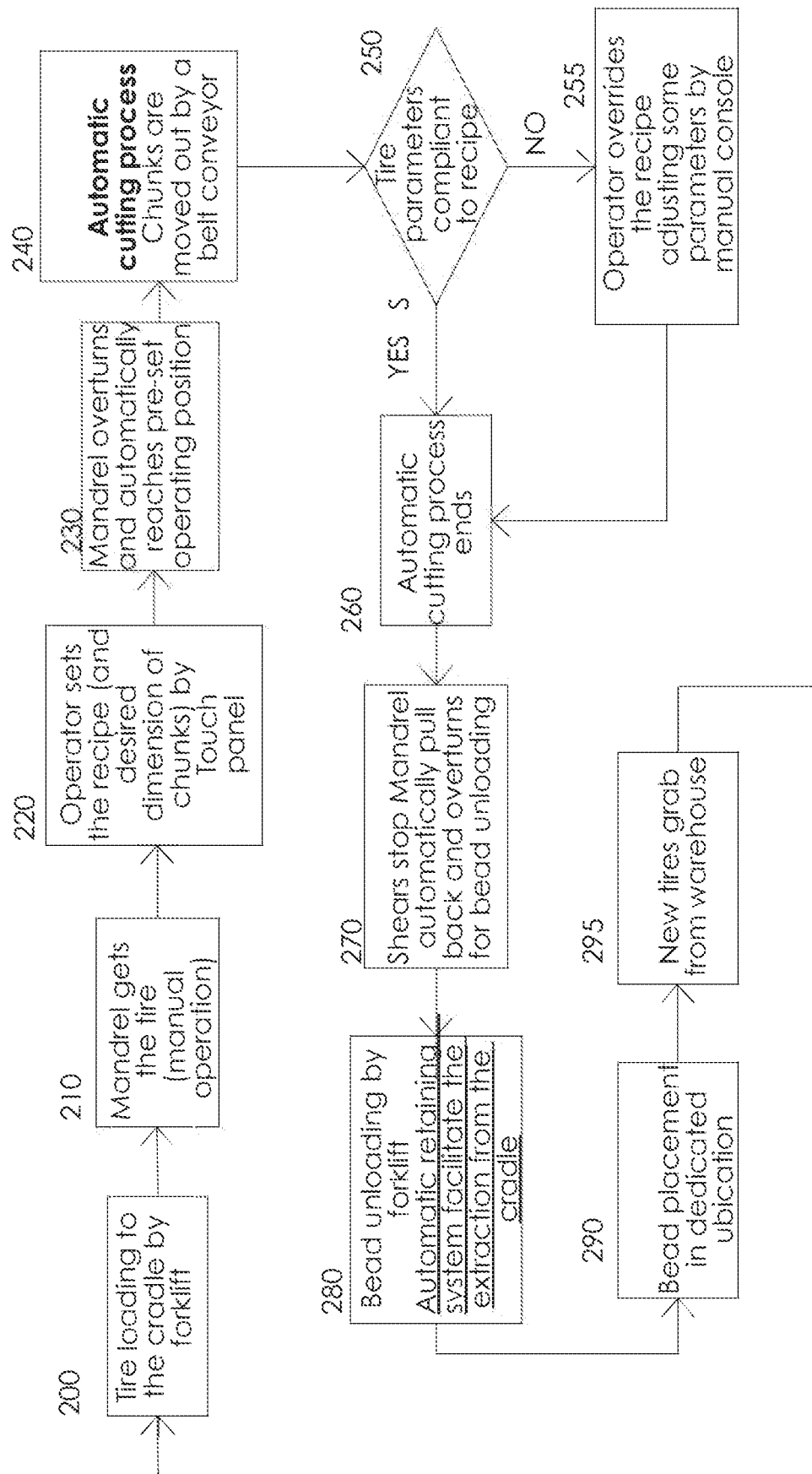
FIG. 2 is a flowchart for an automated tire cutting process, in accordance with an embodiment of the present disclosure.

FIG. 2 presents a flowchart for the downsizing operation, and may be utilized with the apparatus depicted in FIG. 1. At block 200, a tire may be loaded onto the loading cradle using a forklift 310 or similar machine. As described herein, the loading process does not require the use of cranes or additional machinery to place the tire in the downsizing operation, and may be easily performed using only a forklift. However, it will be appreciated that various embodiments do not preclude the use of one or more machines to properly position the tire within the loading cradle.

Once positioned, the mandrel table 130 may receive the tire from the loading cradle, with the mandrel 110 positioned within the center of the tire to secure the tire through various horizontal and vertical movements 210. In an embodiment, the loading cradle 105 and the mandrel table may each be movable along a track. During a loading operation, for example, the loading cradle and the mandrel table may move relative to each other to properly position the mandrel through the center portion of the tire 120. In another embodiment, the mandrel table 130 is vertically and horizontally movable, as well as rotatable. The mandrel table's movement allows precise positioning of the mandrel 110 to receive the tire and properly position the tire during subsequent operations.

After the tire 120 is secured on the mandrel table 210, the operator may set the cutting recipe 220, through one or more user interfaces associated with the control unit 150. The control unit may be in communication with one or more computing devices providing an interface to receive recipe instructions from a user. Alternatively, the control unit may be a computing device in communication with components of the tire downsizing apparatus descried herein, and may have an interface to receive user instruction. In various embodiments, the user interface may be a touch screen interface on which users may specify cutting recipes and aspects of various cutting operation. A cutting recipe, for example, may determine various parameters of the cutting operation, including but not limited to the size and type of cut made to the tire. The cutting operation and its parameters may also be based on tire size, tire model, a pre-determined cut, or an operating condition of the machine. Once control unit receives the recipe and other operating instructions, the control unit may execute the instructions through communication with the different elements of the system, including but not limited to, the loading cradle 105, the mandrel table 130, the cutting apparatus 140, and the conveyor belt 160.

At block 230, the mandrel may position itself to a pre-set operating position, in preparation for a tire cutting operation. In an embodiment, this position may be set by the user, or as part of a selected recipe. In another example, the pre-set operating position may move the tire from a vertical position, i.e., when received from the cradle, to a horizontal or substantially horizontal position, ready to engage the cutting apparatus.

The automatic cutting process at block 240 begins once the operating position for the tire 120 and cutting apparatus 140 is positioned to engage the tire. The control unit executes the cutting process by coordinating the mandrel table 130 and cutting apparatus 140 according to the selected recipe. In an embodiment, the control unit positions the mandrel table 130 such that the mounted tire 120 contacts the cutting apparatus at an appropriate position to remove a chunk from the tire.

Figure 10:
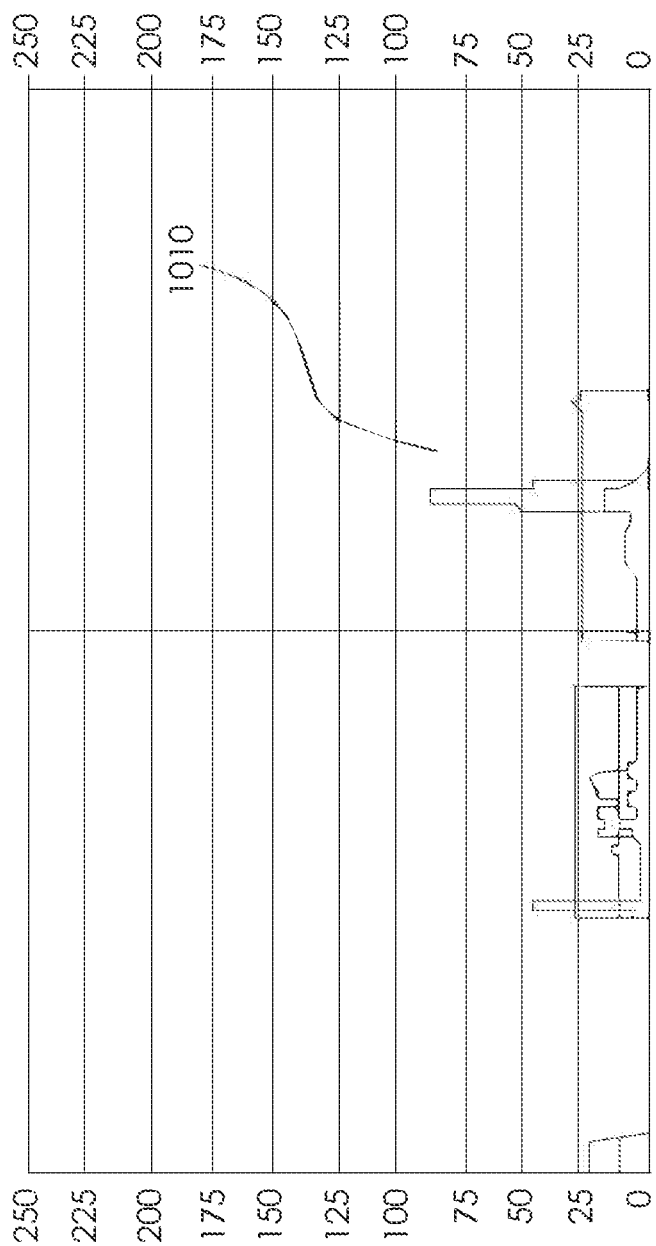
FIG. 10 illustrates an example of monitored operating conditions, in accordance with an embodiment of the present disclosure.

Throughout the cutting operation, the control unit can monitor various system components through one or more sensors, and determine if the tire parameters are compliant with the recipe 250. The sensors may also determine if there are errors or faulty equipment within the system. For example, as depicted in FIG. 10, one or more operating conditions of the blades may be monitored. In one embodiment, graphical data 1010 and numerical data 1020 may be provided about the time, location, and pressure cutting pressure to determine if blades are still sharp, or need to be replaced. Based on that data, either the user or the system can determine if action should be taken. A range of sensors and diagnostic information may be obtained and presented in various methods, depending on user considerations and design preferences.

In an embodiment, compliance determinations at block 250 may be made at pre-determined intervals throughout the process (e.g., time, number of cuts, etc.), in response to a measured system parameter, or depending on user preferences.

If the control system determines that the parameters are not compliant, the operator may manually override the automation 255 and adjust one or more parameters through the control unit, e.g., a user interface associated with the control unit, until the cutting recipe has been completed. Conversely, if the system makes a determination that the tire parameters are indeed compliant to the recipe, then the cutting operation continues until the end of the recipe is reached. At that point, the cutting process ends 260.

Figure 11:
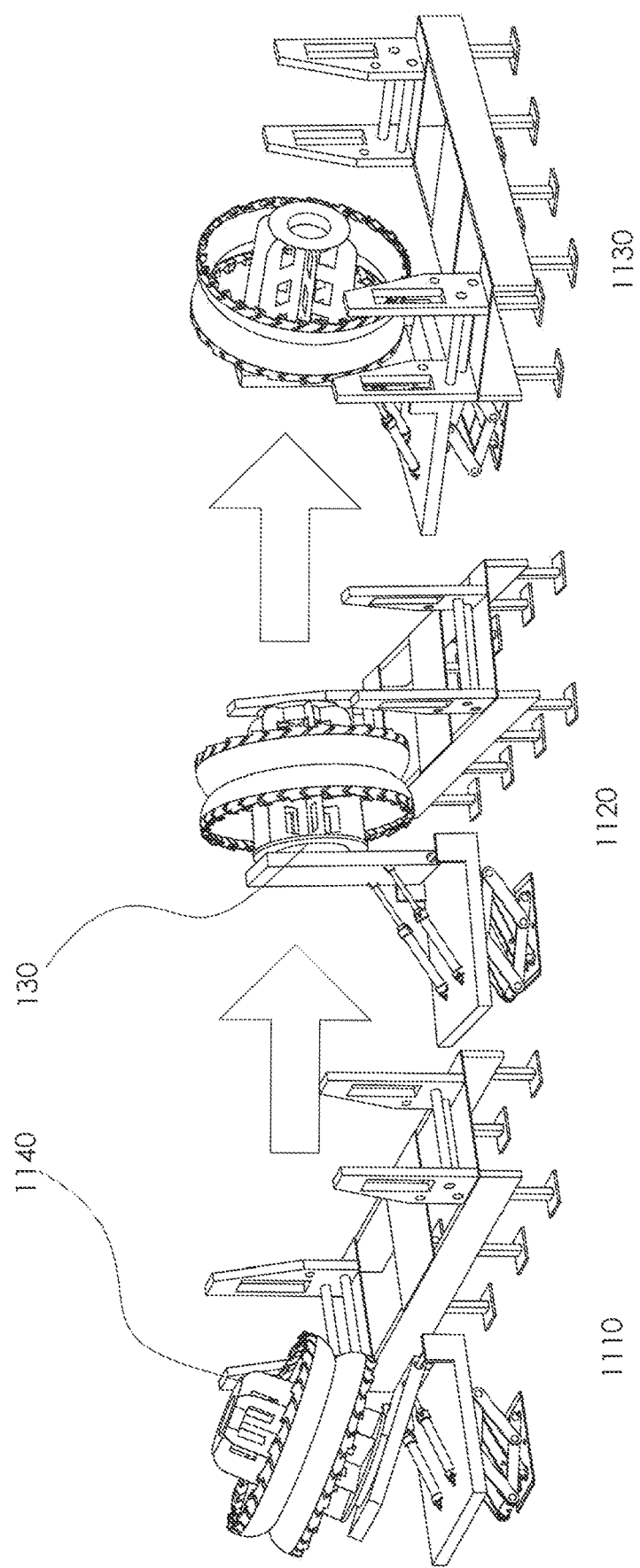
FIG. 11 depicts an unloading operating, in accordance with an embodiment of the present disclosure.

When the cutting operation is finished, at block 260, the shears stop, and the tire bead 1140 remains on the mandrel table. At this point, the mandrel table can return the tire bead 1140 to the cradle 130 for unloading 270. The repositioning of the tire may be done similar to the loading process described with respect to FIGS. 4 and 7, but in reverse. In the unloading process, as illustrated in FIG. 11, the mandrel table repositions itself to move the tire bead 1140 from its horizontal position during cutting 1110, towards a vertical position 1120, to be secured in the cradle 1130. During this process, as the mandrel table 130 automatically moves to a vertical position for unloading after the cutting operation is complete. The cradle arms 410 may separate to provide space to receive the tire, and the mandrel table may extend towards the loading cradle to position the tire between the cradle arms. Once positioned in the loading cradle, the cradle arms may then retract to secure the tire, and the mandrel table may retract, leaving the tire secured on the loading cradle.

Similar to the loading process, the cradle's retaining system (i.e., cradle arms 410) facilitates the tire bead's extraction from the cradle 280. The tire bead 1140 may be easily removed with a common forklift 310, and does not require any heavy machinery or complex process to unload. The tire bead may be placed in a dedicated ubication, i.e., location, 290 (e.g., a location for storage or recycling purposes), and a new tire may be obtained for a subsequent downsizing process 295.

The downsizing operation is not limited to the order or the steps presented herein. These operations may be altered or reordered depending on considerations including, but not limited to, user preference, tire size, desired bead or chunk size, time, efficiency, and available machinery. Additional details on the discussed methods and systems are more fully described below, according to the various examples and embodiments depicted in FIGS. 3-14.

Figure 3:
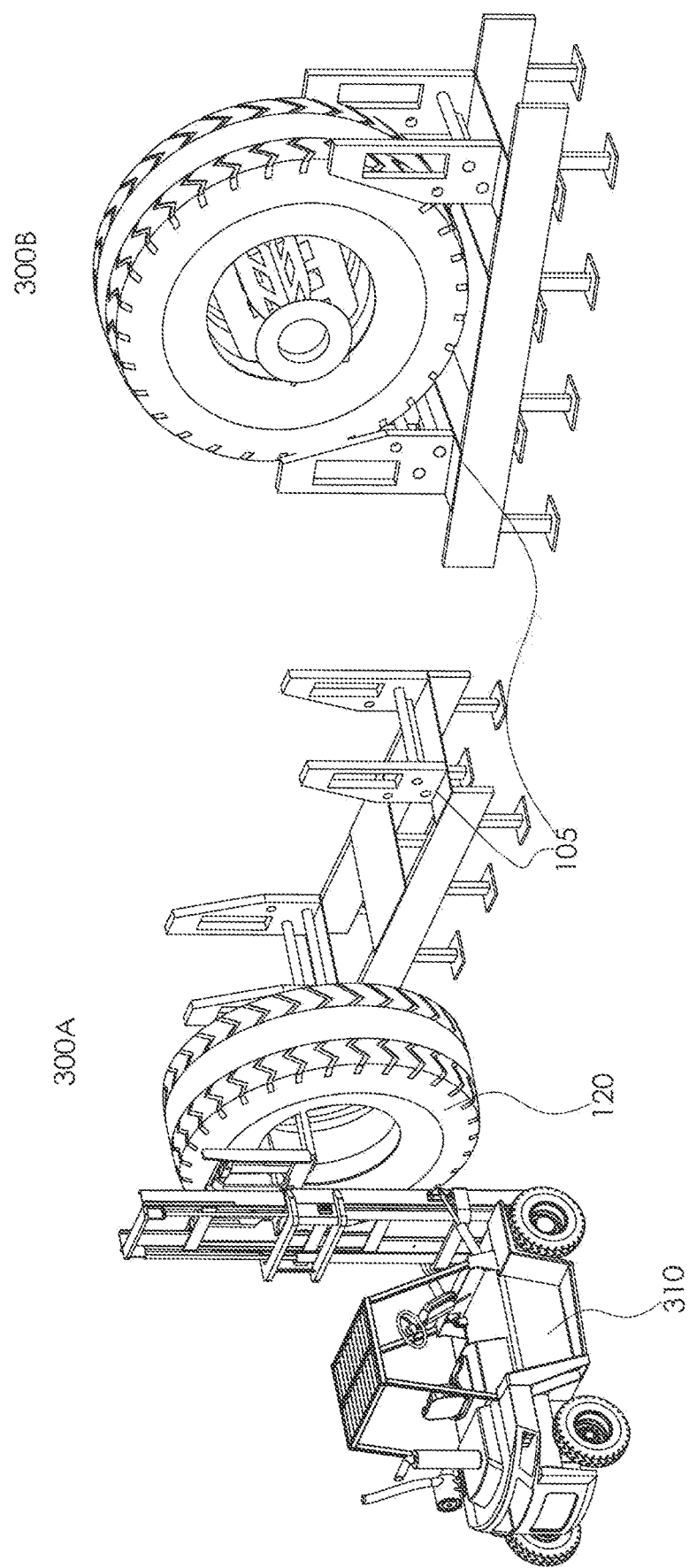
FIG. 3 depicts an example loading operation, and loading cradle, in accordance with an embodiment of the present disclosure.

FIG. 3 illustrates a loading/unloading cradle 105 that may be used in an embodiment. The cradle 105 is designed to simplify the loading and unloading processes. For example, a tire may be loaded vertically onto the loading cradle 105, and securely mounted between the cradle arms 410 using only a forklift 310, for example. In an embodiment, the loading cradle comprises a restraining system to keep the tire in place. Cradle arms 410 may be separated or retracted, to receive tires of various sizes.

In an embodiment, tires are vertically secured to allow the mandrel to efficiently receive and mount the tire on the mandrel table 130. In another embodiment, the cradle may move along a horizontal track to engage the tire with the mandrel. As with other operations described herein, this may be fully automated, using the control unit or other means. Such cradle designs may eliminate the need for a crane or similar heavy handling machines to load a tire to the apparatus, and reduce the operator intervention needed to execute the downsizing process.

Figure 4:
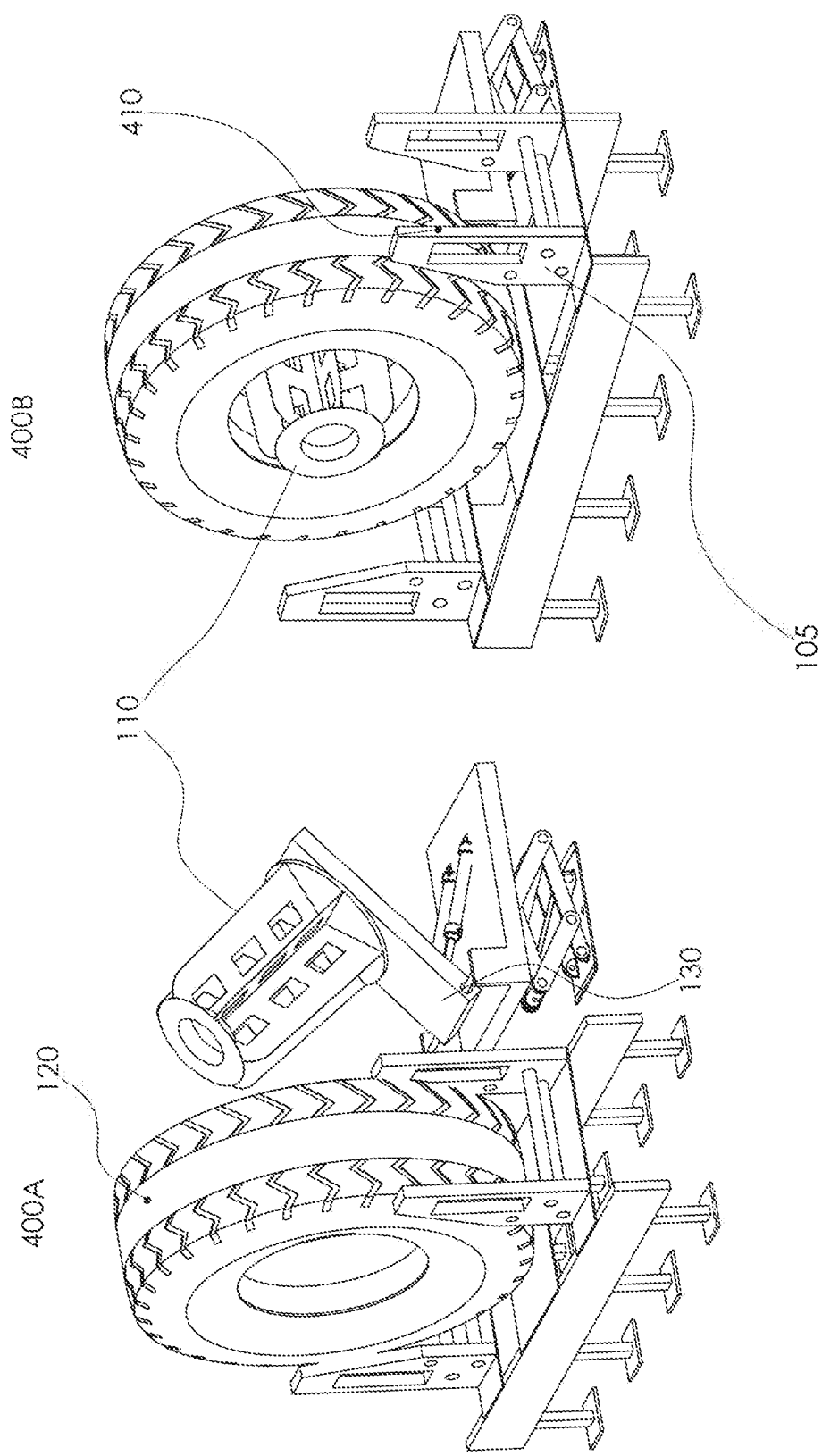
FIG. 4 depicts an example mounting operation, and mandrel table, in accordance with an embodiment of the present disclosure.

FIG. 4 depicts an example mounting operation from the cradle 105 to the mandrel 110 and mandrel table 103. The mandrel's initial angled position becomes horizontal, due to the mandrel table's movement to a vertical position. The vertical mandrel table may horizontally move along the track to position the mandrel 110 within the center of the tire 110, and receive the tire from the loading cradle 105. Once the mandrel 110 is positioned within the center of the tire, the cradle arms 410 may separate so that when the mandrel table 130 transitions from a horizontal to vertical position, the tire 120 may be secured and likewise repositioned to a horizontal position on the mandrel table, in response to movement by the mandrel table 130.

The cradle's restraining system is further utilized in the example embodiment. Before the mandrel receives the tire, the cradle arms 410 on either side of the tire, secure the tire in a vertical position and prevents movement. In the embodiment, after the mandrel 110 is positioned within the center of the tire 120, the cradle arms 410 separate to release the tire and allow the mandrel table 130 to reposition the tire.

As described herein, adjustments to the mandrel table's position and/or the loading cradle's position may be executed through a manual operation, e.g., with an operator controlling each element's movement, or through an automated operation, e.g., with the control unit.

Figure 5:
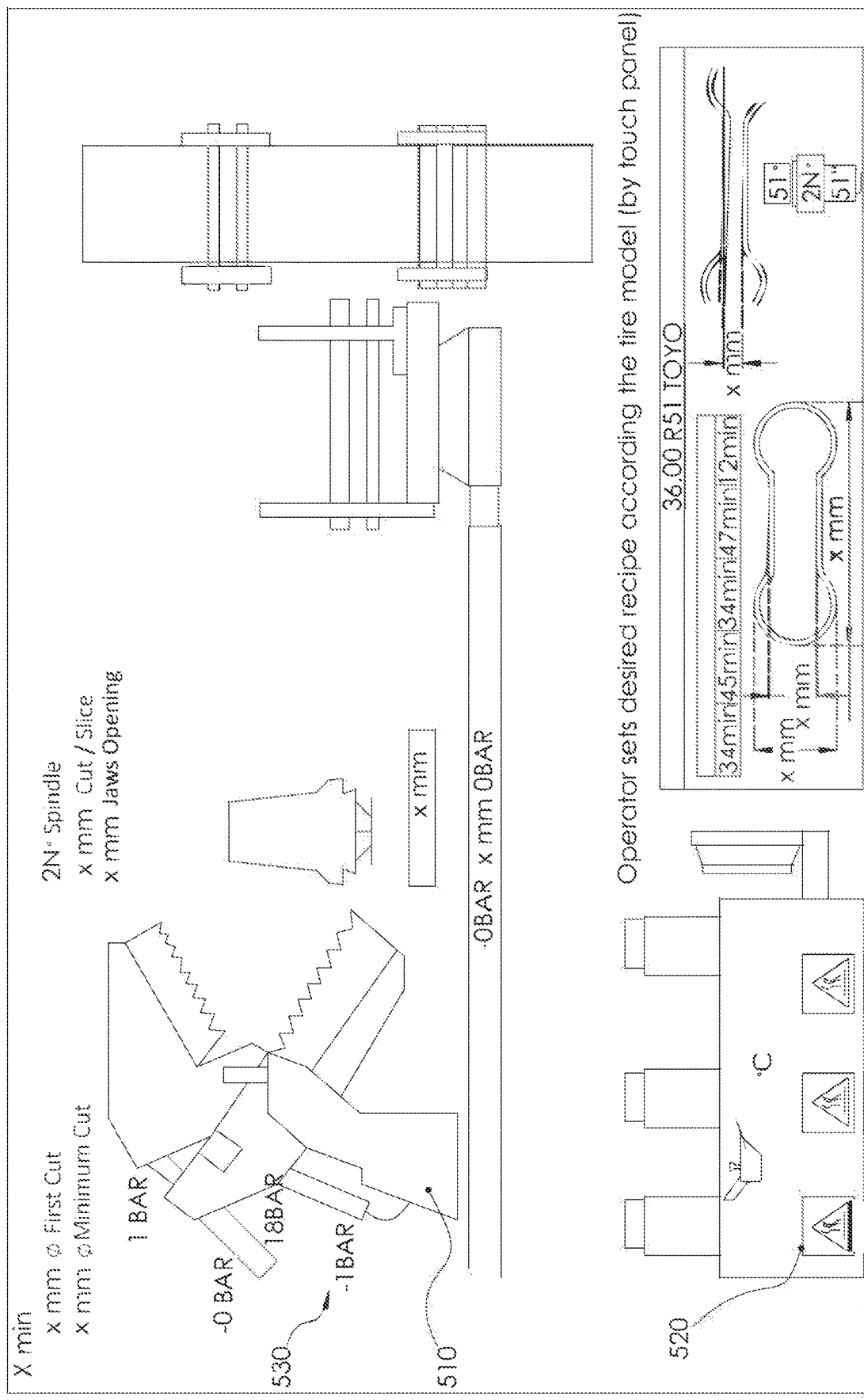
FIG. 5 depicts an operation to select an automation recipe based on tire model.
Figure 6:
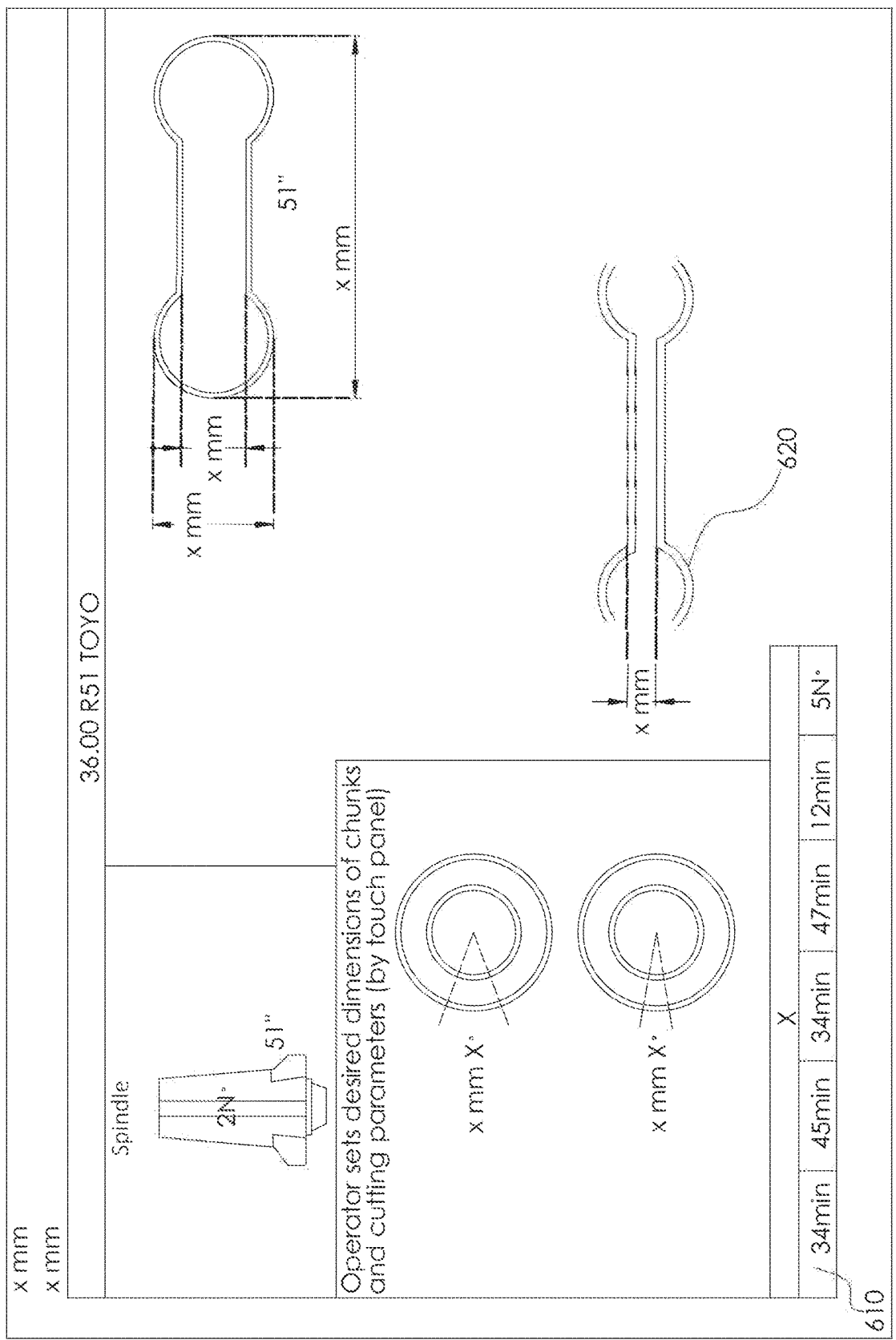
FIG. 6 depicts an operation to select an automation recipe based on chunk size.

FIGS. 5-6 depict example control unit interfaces. The control unit may comprise a touch screen and installed software to execute a user interface that allows operators to easily and efficiently select the desired cutting recipe. The control unit communicates with the various elements of the downsizing system, for example the cradle, the mandrel table, and the cutting apparatus, and may control each element's various functions and movement. As such, the control unit is able to synchronize the downsizing operation and may automate the overall cutting operations. In an embodiment, one or more sensors provide feedback to the control unit, as described below, to provide further information and customization options to the user.

Each of the processes, methods and algorithms described in the preceding sections with regard to the control unit may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and sub-combinations are intended to fall within the scope of this disclosure.

In some embodiments, some or all of the control unit systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc.

Some or all of the modules, systems and data structures may be stored (e.g., as software instructions or structured data) on a computer-readable medium, such as a hard disk, a memory, a network or a portable media article to be read by an appropriate drive or via an appropriate connection. The control unit systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

In an example, the control unit interface may allow a user to select a pre-set recipe, create a custom recipe (which may be based on a pre-set recipe), or adjust one or more characteristics of the downsizing operation. In FIG. 5 for example, the operator may set the desired recipe according a selected tire model. The selected tire model may provide further information about the tire's size, weight, and dimensions.

Recipes may be designed for particular tire models, and define cutting operation parameters to result in chunks of a particular size. In an embodiment, custom recipes may be saved. This provides users with easy access to commonly used recipes, and reduces the amount of time needed to select and execute the downsizing operation.

In another embodiment, the user interface additionally displays system information 510, 520, and may allow operators to adjust one or more system parameters. Such parameters may include cutting pressure, blade sharpness, temperature, power, or position. In another example, position information about one or more components 510, including the cutting apparatus, mandrel table, and loading cradle is provided on the interface. Power and temperature information 520, in addition to other diagnostics, may be provided to allow the user to monitor the system's function, health, and available operations. These may be obtained by one or more sensors 530 throughout the system, which are in communication with the control unit. Users can use this information to determine the optimal recipe for downsizing the tire, for example, or monitor the system's health. Displayed diagnostic information may also help identify potential system issues, or act as a warning if errors occur.

Another example control unit interface is depicted in FIG. 6. In the embodiment, chunk sizes and cutting parameters may be further refined based on specific user preferences or the tire dimensions. Information may be provided about the tire size, tire model, tire bead width, and tread width. Users may set the cuts based on a desired angle, or length of the cut. In another embodiment, an estimated time for completion 610 may be determined based on user selections. Dimensions of the downsized tire bead 620 may also be estimated. Each of these considerations may be used to assist the user in determining the appropriate recipe.

Figure 7:
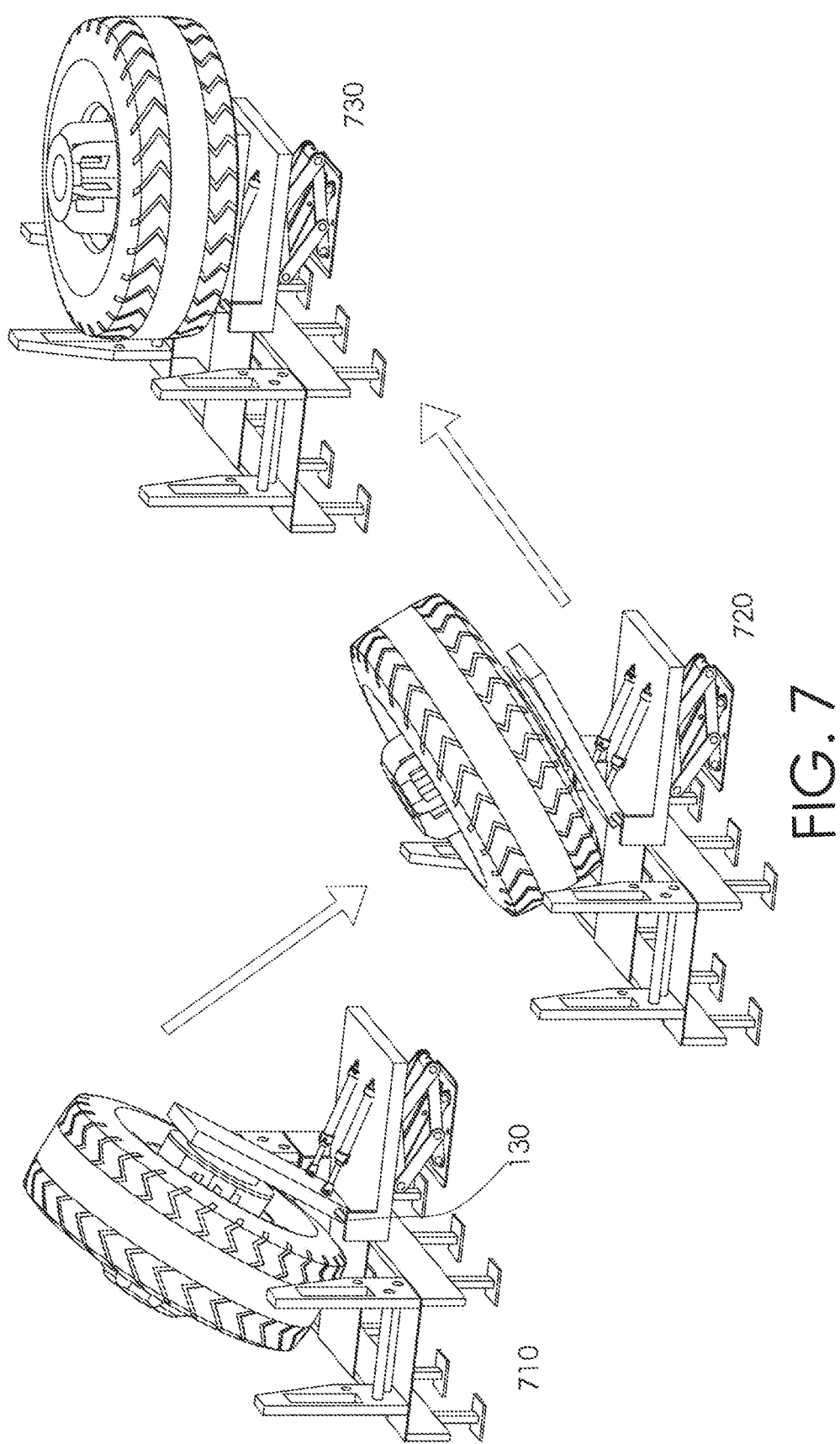
FIG. 7 depicts various mandrel table adjustments and positions, in accordance with an embodiment of the present disclosure.

FIG. 7 depicts a mandrel table during a repositioning operation. In an embodiment, a hydraulic system may support the mandrel table 130 during repositioning, and provide the power to withstand the weight of large tires and precisely control movements. It will be appreciated, however, that other mechanical and electrical systems may be utilized to provide power and support to the mandrel table for movement and repositioning operations.

In the example, the mandrel table places a mounted tire in a position to engage the cutting apparatus. At 710, the tire and mandrel table 130 are in an angled vertical position, which may occur after the loading/unloading cradle receives the tire. In 720, the mandrel table may be lowered so that the tire is repositioned horizontally. This horizontal position 730 prepares the tire to engage with the cutting apparatus, and may be defined as the mandrel table's pre-set operating position, as described above. The cutting apparatus may subsequently engage the tread of the tire and remove chunks from the tire bead, in accordance with various embodiments described herein.

Figure 8:
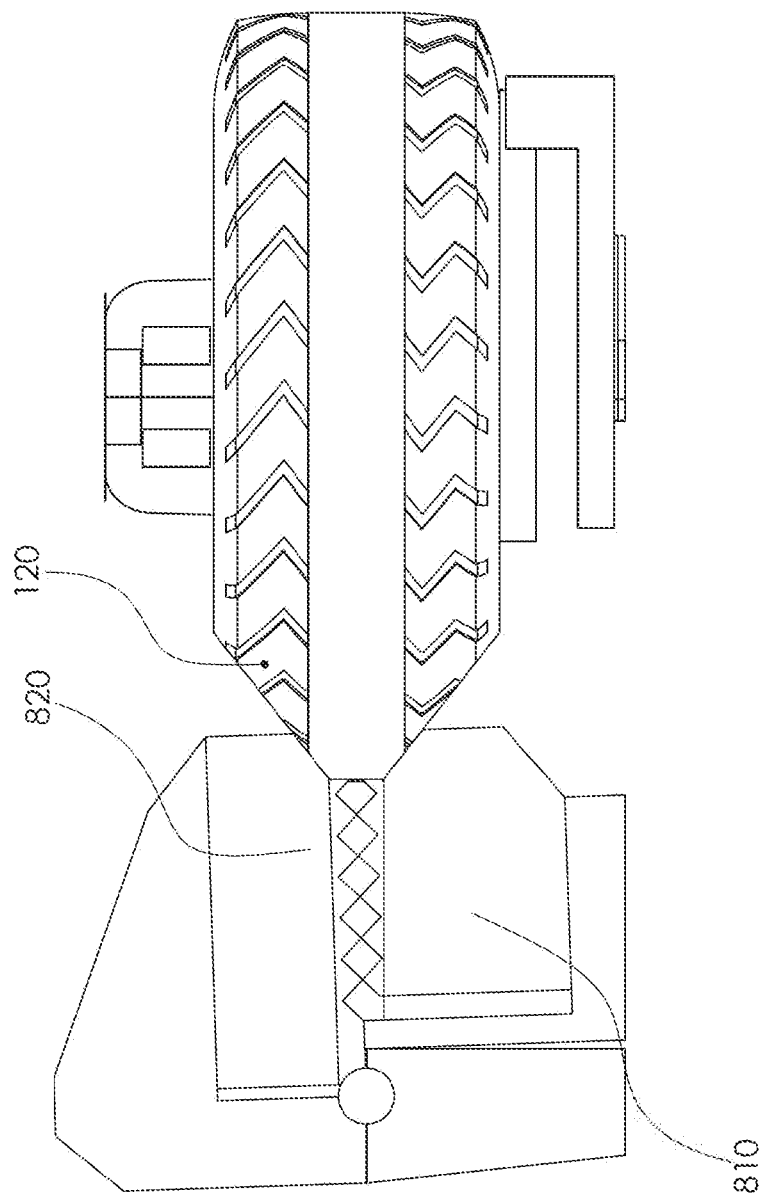
FIG. 8 depicts the cutting apparatus during an automated operation.

FIG. 8 illustrates an example cutting apparatus comprising a plurality of blades 810. In an embodiment, the blades may have asymmetric teeth 820 and may also be L-shaped. In an embodiment, an upper blade may be different than the lower blade. In another embodiment, both blades are the same. For example, an upper blade may comprise a straight blade, curved blade, or shearing blade, while a bottom blade comprises a plurality of teeth, which may be asymmetric. Asymmetrical blades, wherein one or more of the plurality of blades have teeth of varying size, may reduce cutting stresses during downsizing operations. However, various blade combinations and designs may be implemented in accordance with the embodiments described herein.

As depicted in FIG. 8, the blades 810 are positioned opposite to each other, so that the blades may cut the tire in a shearing action, and remove one or more portions from the tire. In an embodiment, the blades contact opposite sides of a width of the tire. In another example, the blades shear only outer portions of the tire, and leave the bead of the tire intact. Various sized cuts may be made to the tire in accordance to a selected recipe, the type of blade(s) on the cutting apparatus, or manual operation, as described herein.

The cutting apparatus uses a power unit 170 to provide the necessary force to cut through the tires and remove the tire chunks. In an embodiment, the power unit is a hydraulic unit 1210. In an embodiment, the power unit is the same unit used to support the mandrel table during repositioning operations.

During a cutting operation, the control unit may coordinate the cutting apparatus and the mandrel table's movements to remove a tire chunk according to the defined recipe. The control unit may signal when the cutting apparatus should execute the cutting operation. The control unit may also signal mandrel table 130 to rotate the tire at a predetermined amount after each cut, to correctly position the mandrel table and cutting apparatus for a subsequent cut. The synchronization between the two elements should result in chunks and tire beads sized according the selected recipe.

After a cut is completed, the removed chunk may fall onto a conveyor belt 160 located beneath the cutting apparatus and tire. The belt's movement may also be automated and controlled by the control unit. Users may select the speed and timing of the belt's operation, for example. In an embodiment, the conveyor belt 160 can transport the chunks to a different machine or location, for collection, recycling, or further processing.

Figure 9:
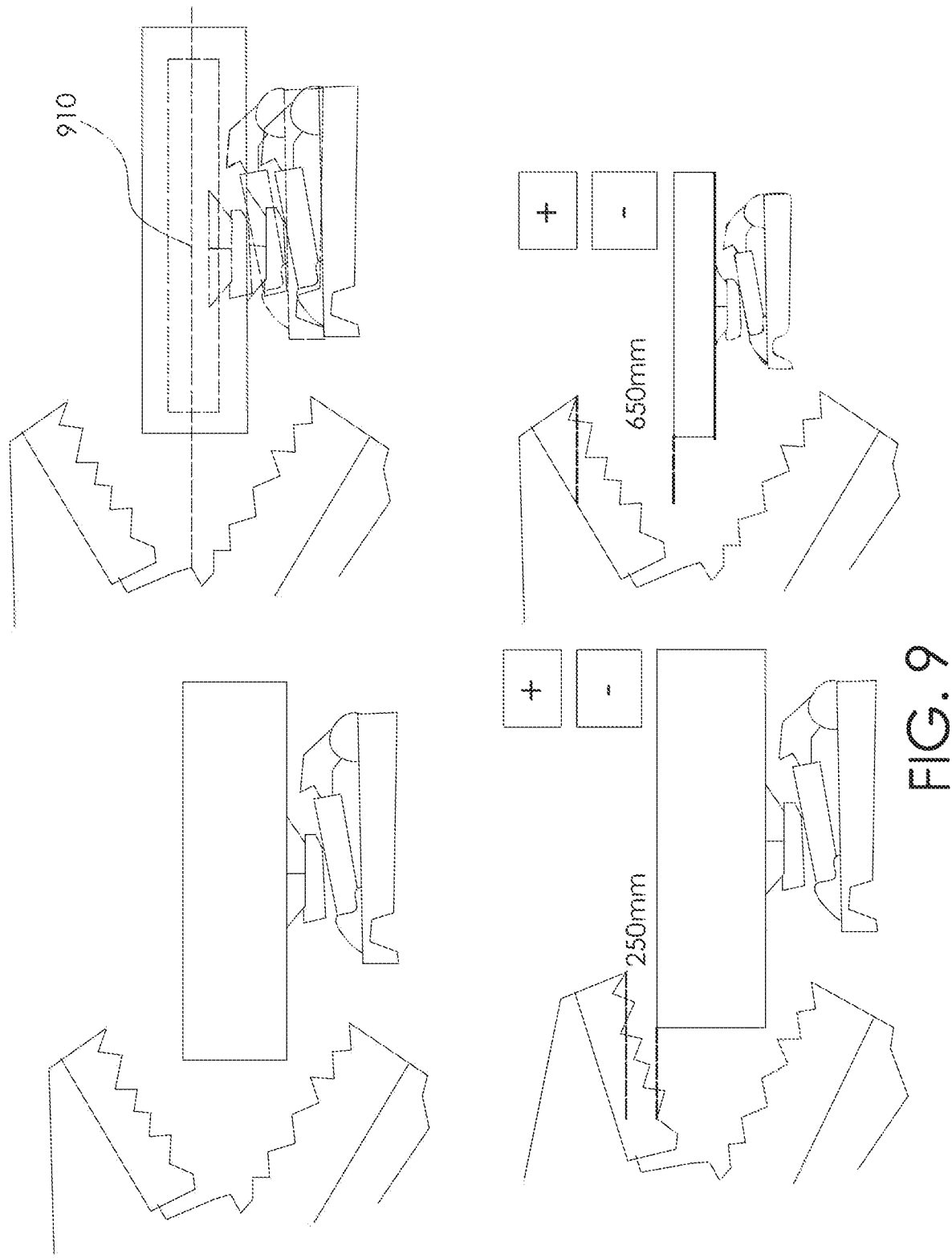
FIG. 9 depicts an example manual override during an automated operation.

FIG. 9 depicts an example manual adjustment during a cutting operation. Manual adjustments to a selected recipe may be made at any time during the downsizing operation. This feature enhances both customization and system safety. In an embodiment, the manual override may comprise adjusting system parameters through the control unit's user interface. A user action, such as a swipe or other touchscreen movement 910, may signal to the control unit that a manual override is being executed. From there, the user may adjust recipe parameters (e.g., cut size), or alter the position of system components. In another embodiment, manual adjustment may be done on a manual console located on or near the downsizing system.

As illustrated in FIG. 10, manual adjustments may be desired due to system information obtained from one or more sensors. The sensors may gather information before, during, or after downsizing operations. In one example, sensors can obtain cutting pressure data 1010, 1020 during each cut, as well as the time each cut occurred. Other diagnostic information may be inferred from the sensor data, including, but not limited to, blade sharpness or system errors, for example.

FIG. 11 illustrates the unloading process after the cutting recipe has been completed. In an embodiment, only the tire bead 1140 remains on the mandrel after the cutting operation. At 1110, the mandrel table 130 begins to reposition the tire for placement in the cradle. The mandrel table 130, lifts the tire into a horizontal position 1120, and places the tire within the cradle 1130. During this operation, the tire bead 1140 remains secured by the mandrel. In an example, the cradle arms are separated to receive the tire bead, and retract to secure the tire bead once the tire is in its proper position within the cradle. Once secured, the mandrel table may move along a track to extract the attached mandrel from the center of the tire bead. Then, similar to the loading process, a forklift or similar machine, may remove the tire bead from the loading/unloading cradle.

Figure 12:
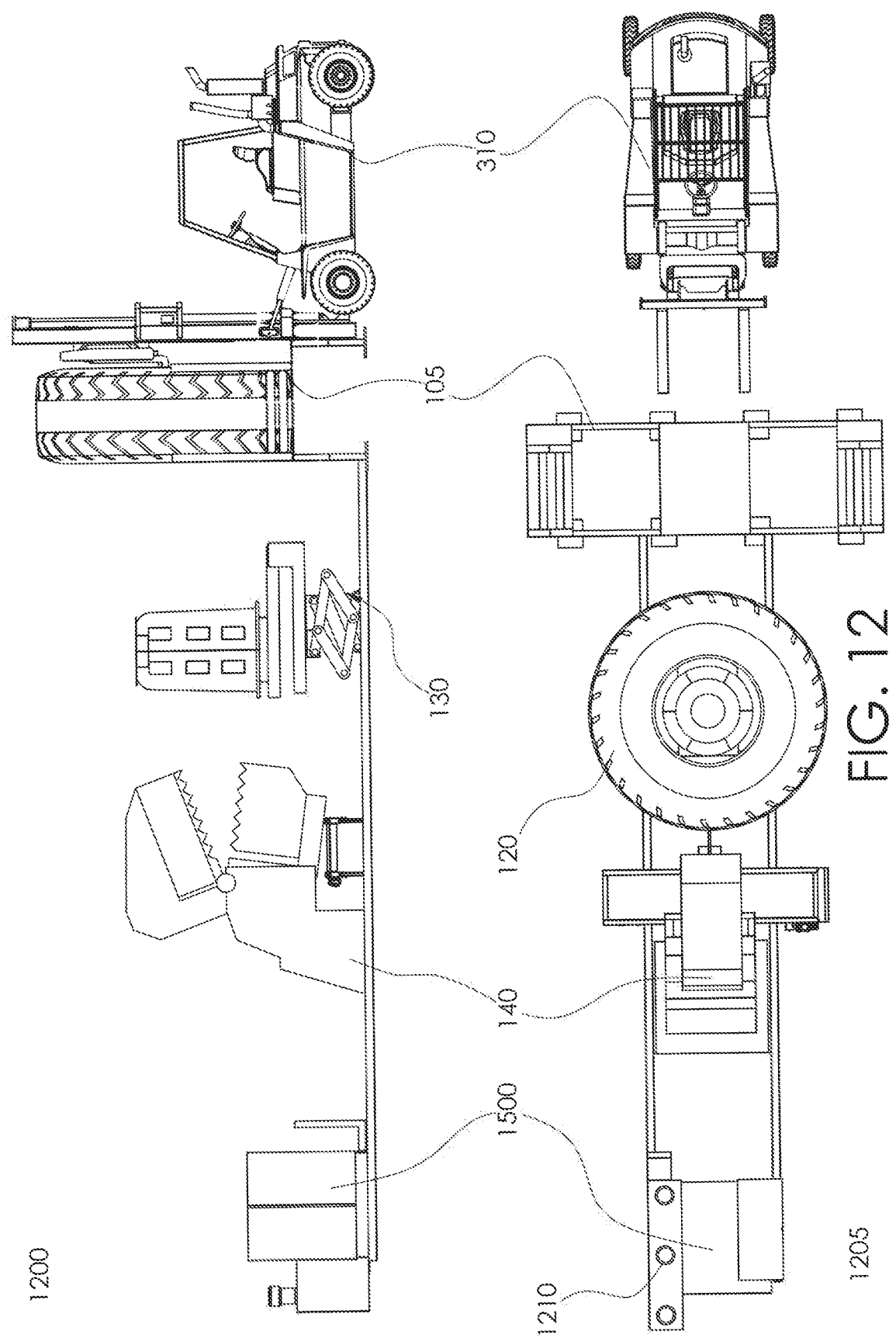
FIG. 12 depicts a side view and plan view of the downsizing machine, in accordance with an embodiment of the present disclosure.

FIG. 12 provides a side view and plan view of the downsizing machine, during the loading process. In 1200, the tire has been mounted onto the cradle by a forklift, and secured until the mandrel table 130 receives the tire. The plan view 1205 depicts the tire mounted on the mandrel table, in a position to engage the cutting apparatus 140. The hydraulic unit 1210 powers the cutting apparatus, and the control unit 150 coordinates the execution of a selected recipe for downsizing.

Figure 13:
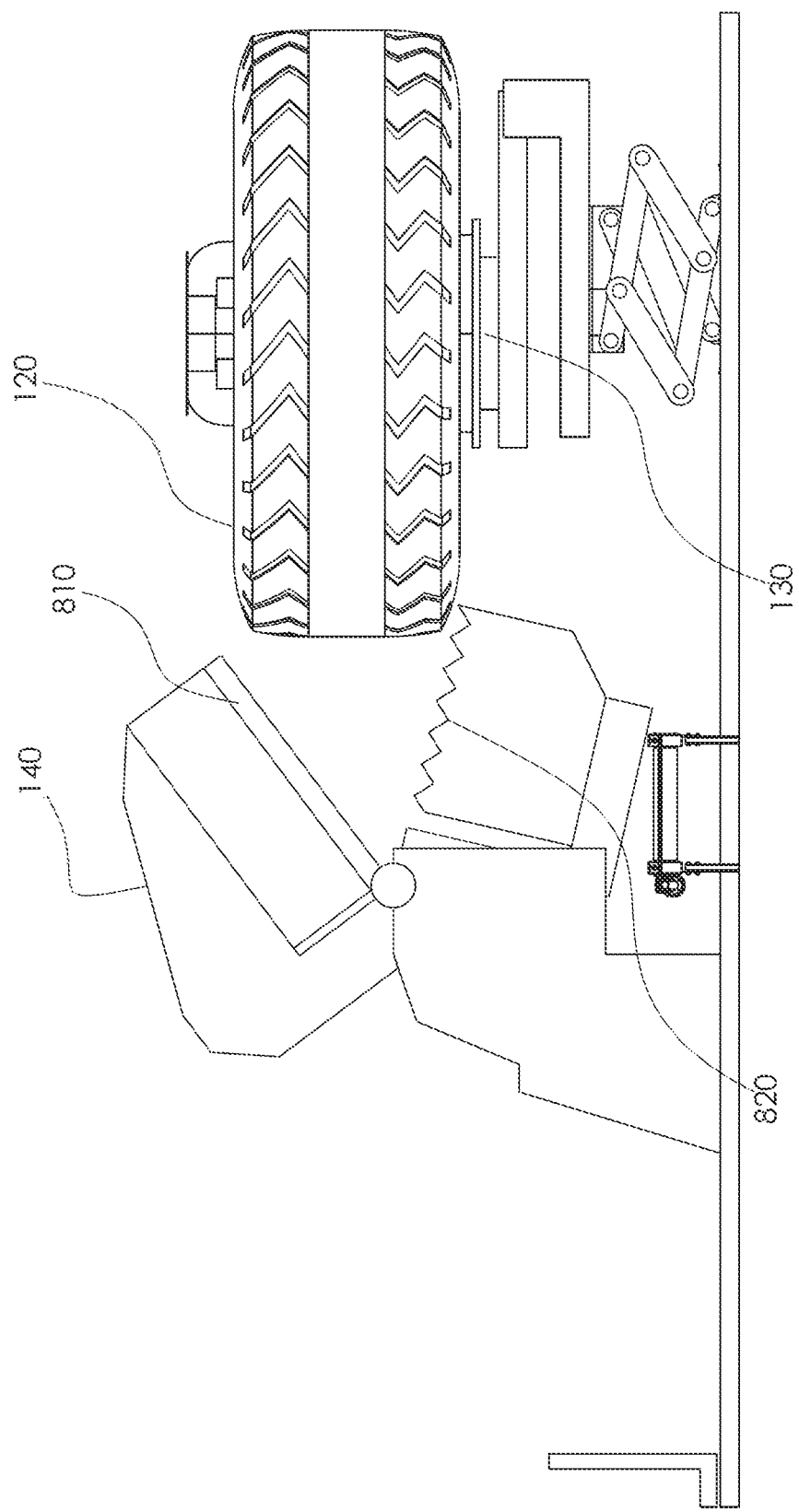
FIG. 13 depicts a side view of the machine during a cutting operation.

FIG. 13 illustrates the cutting apparatus 140, mandrel table 130, and tire 120 during a cutting process. The asymmetric blades reduce cutting stress during the cutting operations, and allow for precise cuts to create chunks according the executed recipe. The mandrel table 130 serves to secure and position the tire during cutting operations, in accordance with the embodiments described herein.

Figure 14:
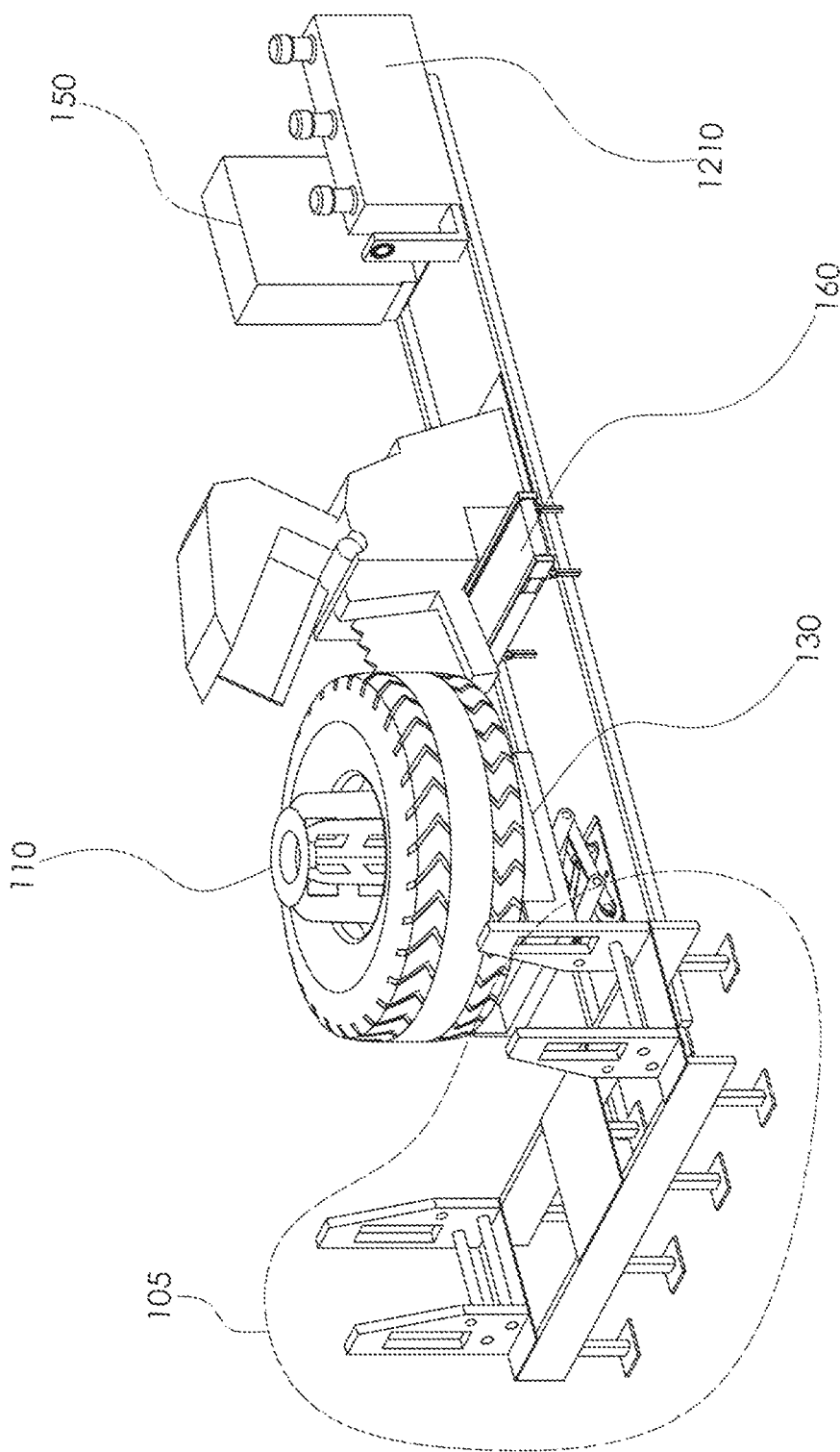
FIG. 14 depicts various features of the tire downsizing machine in accordance with an embodiment of the present disclosure.

An alternative perspective view of the downsizing apparatus during a cutting process is depicted in FIG. 14. The cradle 105 comprises a retaining system to secure the tire during the loading and unloading process. The mandrel 110 is affixed to the mandrel table 130 and secures the mounted tire during downsizing. The conveyor belt 160 is below the cutting apparatus, to capture and transport chunks after removal from a bead of the tire. In embodiments, after a cut is made, a chunk of the tire falls directly onto the conveyor belt. The control unit 150 and hydraulic unit 1210 are positioned behind the cutting apparatus and serve to, respectively, execute the pre-selected recipe, and provide power to the cutting apparatus.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While various aspects and embodiments have been disclosed herein, other aspects and embodiments will be apparent to those skilled in the art. The various aspects and embodiments disclosed herein are for purposes of illustration and are not intended to be limiting.

What is claimed:

1. A tire downsizing system comprising:
a tire cradle comprising retractable arms to receive and secure a tire;
a mandrel table comprising a mandrel extending from a top surface of the mandrel table, the mandrel table being movable to receive the tire from the tire cradle by positioning the mandrel in a center of the tire, and adjusting a position of the mandrel table to remove the tire from the tire cradle, wherein the mandrel table is further movable to adjust an orientation of the tire mounted on the mandrel table;
a cutting apparatus comprising an upper blade positioned opposite a lower blade, and a power unit oppositely driving the upper blade and the lower blade in a shearing motion;
a control unit to receive, through a user interface, one or more instructions indicative of an automated cutting operation to remove a plurality of pieces from a bead of the tire, while leaving the bead of the tire intact, and synchronize movements of the mandrel table and the cutting apparatus in accordance with the tire cutting operation,
wherein the synchronized movements comprise:
adjusting the mandrel table to horizontally position the tire between the blades of the cutting apparatus;
oppositely driving the upper and lower blades to shear a piece from the bead of the tire;
rotating the tire a predetermined amount after the piece has been removed;
repeating the shearing and rotating motion until the plurality of pieces have been removed from the bead of the tire; and
a conveyor belt to receive and transport the at least one piece removed from the bead of the tire.

2. The tire downsizing system of claim 1, wherein the mandrel table is movable to adjust a horizontal, a vertical, and a rotational orientation of the tire.

3. The tire downsizing system of claim 1, wherein at least one of the upper blade and the lower blade of the cutting apparatus comprises at least one of: asymmetric teeth or an L-shape.

4. The tire downsizing system of claim 1, wherein the automated cutting operation adjusts at least one of the horizontal orientation of the tire and the rotation of the tire based on information received through the user interface indicative of one or more of: a tire size, a tire model, a desired tire bead size, a desired tire piece size, a type of cut, and a current operating condition.

5. The tire downsizing system of claim 1, further comprising:
one or more sensors to monitor at least one operating condition of the tire downsizing system.

6. The tire downsizing system of claim 5, wherein the operating condition is one or more of: a cutting pressure, a blade sharpness, a temperature of the cutting apparatus, and a temperature of the mandrel table.

7. The tire downsizing system of claim 1, wherein the control unit controls a movement of the conveyor belt.

8. The tire downsizing system of claim 1, wherein during the automated cutting operation, the control unit receives one or more instructions indicative of an update to the automated cutting operation and overrides the automated cutting operation to perform the update.

9. The tire downsizing system of claim 8, wherein the update to the automated cutting operation comprises at least one of: stopping the automated cutting operation, changing a type of cut, changing a tire rotation speed, and changing a position between the cutting apparatus and the mandrel table.

* * * * *